(12) United States Patent
Kohama

(10) Patent No.: US 8,287,049 B2
(45) Date of Patent: Oct. 16, 2012

(54) PRETENSIONER AND SEAT BELT APPARATUS

(75) Inventor: Shigeru Kohama, Tokyo (JP)

(73) Assignee: Takata Corporation, Tokyo (JP)

( * ) Notice: Subject to any disclaimer, the term of this patent is extended or adjusted under 35 U.S.C. 154(b) by 296 days.

(21) Appl. No.: 12/451,789

(22) PCT Filed: Apr. 1, 2008

(86) PCT No.: PCT/JP2008/056475
§ 371 (c)(1),
(2), (4) Date: Dec. 1, 2009

(87) PCT Pub. No.: WO2008/155942
PCT Pub. Date: Dec. 24, 2008

(65) Prior Publication Data
US 2010/0176649 A1    Jul. 15, 2010

(30) Foreign Application Priority Data

Jun. 20, 2007    (JP) ................................. 2007-163071

(51) Int. Cl.
*A62B 35/00* (2006.01)
(52) U.S. Cl. ....................................... 297/479; 297/480

(58) Field of Classification Search .................. 297/479, 297/480; 280/806
See application file for complete search history.

(56) References Cited

U.S. PATENT DOCUMENTS

| 6,250,682 | B1 |   | 6/2001 | Betz et al. |         |
|-----------|----|---|--------|-------------|---------|
| 6,250,683 | B1 | * | 6/2001 | Betz        | 280/806 |
| 6,877,776 | B2 | * | 4/2005 | Ukita et al. | 280/806 |
| 7,631,900 | B2 | * | 12/2009 | Nakayama et al. | 280/806 |

FOREIGN PATENT DOCUMENTS

| JP | 2003-146184 | 5/2003 |
| JP | 2007-062600 | 3/2007 |
| JP | 2007-076493 | 3/2007 |

* cited by examiner

*Primary Examiner* — Sarah B McPartlin
(74) *Attorney, Agent, or Firm* — Manabu Kanesaka

(57) ABSTRACT

A pretensioner and a seat belt apparatus are provided that can diffuse the heat of high-temperature gas and prevent the heat from concentrating locally on a wire.

A pretensioner 10 has a housing 12 that allows a wire 11 to run therethrough and a cylinder 14. One end of the wire 11 is connected to a seat belt buckle 9, and the other end of the wire 11 is held by a piston 15. An apertured member 26, that covers at least the gas generator 23 side of a peripheral surface of the wire 11, is provided in the housing 12. A plurality of through-holes 29 are provided in a protecting portion 27 of the apertured member 26.

6 Claims, 5 Drawing Sheets

PRETENSIONER AND SEAT BELT APPARATUS

TECHNICAL FIELD

The present invention relates to a pretensioner that pulls in a seat belt when a rapid deceleration of a vehicle occurs, and a seat belt apparatus.

BACKGROUND ART

Conventionally, on a seat of a vehicle, an occupant-restraining seat belt apparatus is provided that inhibits the occupant from being thrown forward due to the inertial force when a vehicle stops suddenly or an impact such as a collision occurs. Usually, such a seat belt apparatus has an emergency-automatic-locking-type retractor (hereinafter abbreviated as ELR), that does not restrain the movement of an occupant during normal driving and, only when the vehicle undergoes an impact, locks a reel shaft of the seat belt to prevent the seat belt from being drawn out any more. When a deceleration equal to or greater than a predetermined value is detected, the ELR locks the reel shaft in a very short time and thereby prevents the seat belt from being drawn out any more.

However, in the case where merely the reel shaft is locked as in the above-mentioned ELR, if the seat belt restraining the occupant is wound loosely on the reel shaft, even if the reel shaft is locked, the seat belt is drawn out to some extent. Furthermore, even if the seat belt is not wound loosely, the seat belt is drawn out from the time that a deceleration equal to or greater than a predetermined value is detected until the reel shaft is locked.

For this reason, as a device that cancels out to some extent the drawing-out of a seat belt due to looseness of the seat belt or a time delay until the reel shaft is locked, there is known a pretensioner that pulls in a seat belt buckle when a predetermined deceleration is detected (for example, see Patent Document 1).

The pretensioner described in Patent Document 1 has a wire that is connected at one end to a seat belt buckle and fixed at the other end to a piston in a cylinder, and a housing that allows the wire to run therethrough and holds the cylinder. When a deceleration of the vehicle is detected, high-pressure gas is ejected to a gas chamber formed in the housing, thereby moving the piston and pulling in the wire. A guard pipe that protects the wire is disposed in the gas chamber in the housing.

Patent Document 1: Japanese Unexamined Patent Application Publication No. 2003-146184 (FIG. 2 and FIG. 4)

DISCLOSURE OF INVENTION

Problem to be Solved by the Invention

However, in the above-described related art, the high-pressure gas flowing into the gas chamber is blocked by the guard pipe that protects the wire, and therefore tends to be guided to minute gaps at either end of the guard pipe. Consequently, high-temperature heat can possibly concentrate locally on the portions of the wire exposed through the gaps.

Therefore, an object of the present invention is to provide a pretensioner and a seat belt apparatus that can disperse the heat of high-temperature gas and prevent the heat from concentrating locally on a wire.

Means for Solving the Problem

In order to achieve the above-mentioned object, a first invention is a pretensioner that exerts a pull-in force on a seat belt that includes at least a lap belt among a shoulder belt and a lap belt, when a vehicle undergoes an impact. The pretensioner includes a wire that is connected at one end to the seat belt; a piston that is connected to the other end of the wire; a cylinder that houses the piston slidably; a housing that allows the wire to run therethrough and holds the cylinder; gas-supplying means that supplies gas into the cylinder through the interior of the housing in order to operate the piston in a direction in which the wire is pulled in; and an apertured member that is arranged in the housing so as to cover at least the gas-supplying means side of a peripheral surface of the wire, and that has a plurality of through-holes and thereby is able to diffuse the gas.

In this pretensioner, when the vehicle undergoes an impact, the gas-supplying means ejects gas (hereinafter referred to as high-pressure gas) in order to move the piston, and the high-pressure gas is supplied to the cylinder through the interior of the housing. Then, the piston is moved by the pressure of the high-pressure gas and pulls in the wire, and simultaneously the seat belt is pulled in.

Here, since the apertured member having a plurality of through-holes is provided at least on the gas-supplying means side of the peripheral surface of the wire, when the high-pressure gas is ejected by the gas-supplying means, the high-pressure gas is diffused by the plurality of through-holes of the apertured member. Consequently, the high-temperature heat of the high-pressure gas can be dispersed and the high-temperature heat can be prevented from concentrating locally in one part of the wire as it does in a related structure.

Preferably in a second invention, the apertured member has a seal portion that seals a gap between the wire and an inner wall surface of the housing; and a protecting portion that extends from the seal portion to a cylinder side and covers a peripheral surface of the wire, the two portions being formed integrally. A plurality of through-holes are provided in the protecting portion.

In the second invention of the present application, the seal portion seals the gap between the wire and the inner wall surface of the housing, and the protecting portion covers the peripheral surface of a portion of the wire closer to the cylinder than the seal portion. Thus, a single apertured member serves both to protect the wire from the high-pressure gas ejected from the gas-supplying means and to enhance the pressure efficiency at that time. In addition, in the second invention of the present application, since the seal portion and the protecting portion are formed integrally, as compared with the case where the protecting portion and the seal portion are separate members, the number of components can be reduced, thereby reducing the material cost and assembly cost.

Preferably in a third invention, through-holes are provided at a plurality of locations in the circumferential direction of the protecting portion and further, where the through-holes provided at the plurality of locations in the circumferential direction are referred to as one row, the through-holes are provided in a plurality of the rows in the axial direction of the protecting portion.

In the third invention of the present application, when the high-pressure gas is ejected by the gas-supplying means, the high-pressure gas is efficiently diffused by the plurality of through-holes provided at the plurality of locations in the circumferential direction and in the plurality of rows in the axial direction of the protecting portion. Consequently, the high-temperature heat of the high-pressure gas can be efficiently dispersed and the high-temperature heat can be efficiently prevented from concentrating locally in one part of the wire.

Preferably in a fourth invention, the protecting portion is formed such that the inner diameter thereof is larger than the outer diameter of the wire by a predetermined value.

Thus, a gap can be provided between the protecting portion and the wire so that the protecting portion (or the apertured member that has the protecting portion) can be prevented from being moved by the movement of the wire when the wire is pulled in by the high-pressure gas ejected from the gas-supplying means.

Preferably in a fifth invention, the housing has a locking portion for restricting movement of the seal portion when the wire is pulled in.

In the fifth invention of the present application, the locking portion locks the seal portion to the housing. Thus, when the wire is pulled in by the high-pressure gas ejected from the gas-supplying means, the seal portion (or the apertured member that has the seal portion) can be prevented from being moved by the movement of the wire.

Preferably in a sixth invention, the apertured member has a weak portion that allows the protecting portion to separate from the seal portion when the wire is pulled in.

Thus, when the wire is pulled in by the high-pressure gas ejected from the gas-supplying means, even if the protecting portion is moved by the movement of the wire, the weak portion allows the protecting portion to separate from the seal portion and the seal portion can be prevented from moving.

A seventh invention is a seat belt apparatus including a seat belt that includes at least a lap belt among a shoulder belt and the lap belt; a retractor that retracts the seat belt; a tongue provided on the seat belt; and a pretensioner that exerts a pull-in force on the seat belt when the vehicle undergoes an impact. The pretensioner includes a wire that is connected at one end to the seat belt; a piston that is connected to the other end of the wire; a cylinder that houses the piston slidably; a housing that allows the wire to run therethrough and holds the cylinder; gas-supplying means that supplies gas into the cylinder through the interior of the housing in order to operate the piston in a direction in which the wire is pulled in; and an apertured member that is arranged in the housing so as to cover at least the gas-supplying means side of a peripheral surface of the wire, and that has a plurality of through-holes and thereby is able to diffuse the gas.

In this seat belt apparatus, by providing the above-described pretensioner, the high-temperature heat of the high-pressure gas can be diffused and prevented from concentrating locally in one part of the wire as it does in a related structure.

Advantage

According to the present invention, heat of high-temperature gas can be dispersed and the heat can be prevented from concentrating locally on a wire.

BEST MODE FOR CARRYING OUT THE INVENTION

A preferred embodiment of a pretensioner and a seat belt apparatus according to the present invention will be described in detail below with reference to the drawings.

FIG. 1 is a perspective view illustrating a seat belt apparatus having an embodiment of a pretensioner according to the present invention.

In FIG. 1, a seat belt apparatus 1 has a seat belt 3 that is drawn out from a retractor 2 and restrains an occupant. The seat belt 3 has a shoulder belt portion 3a (a shoulder belt) for restraining the occupant from his/her shoulder to waist, and a lap belt portion 3b (a lap belt) for restraining the occupant at his/her waist. The retractor 2 is a device that retracts the seat belt 3, and is fixed to a lower portion of a center pillar 4 inside the vehicle chamber. The seat belt 3 is drawn out from the retractor 2 toward the upper side of the vehicle body, runs through a through-ring 5 attached to an upper portion of the center pillar 4, and is folded back toward the lower side of the vehicle body. The distal end of the seat belt 3 is fixed to an anchor plate 7 provided between the center pillar 4 and a seat 6.

A tongue 8 is provided on the seat belt 3 between the through-ring 5 and the anchor plate 7, and the seat belt 3 runs therethrough. The tongue 8 is detachably attached to a seat belt buckle 9 that is arranged on the side of the seat 6 opposite from the anchor plate 7. When the tongue 8 is attached to the seat belt buckle 9, the portion of the seat belt 3 from the tongue 8 to the through-ring 5 serves as the shoulder belt portion 3a, and the portion from the tongue 8 to the anchor plate 7 serves as the lap belt portion 3b.

The seat belt buckle 9 holds a pretensioner 10 of the present embodiment. The pretensioner 10 is a device that pulls in the seat belt buckle 9 when a vehicle stops suddenly or an impact such as a collision occurs, thereby restraining the occupant with the seat belt 3 that includes the shoulder belt portion 3a and the lap belt portion 3b.

The pretensioner 10 has a wire 11 that is connected to the seat belt buckle 9, a housing 12 that is fixed to the vehicle body either directly or through a bracket (not shown) or the like, for example, and that allows the wire 11 to run therethrough, a holder 13 that is held on one side of the housing 12, and a cylinder 14 that is held on the other side of the housing 12. The holder 13 has a guide portion 13a (see FIG. 2) that guides and bends a portion of the wire 11.

FIG. 2 is a vertical sectional view of the pretensioner 10. In FIG. 2, one end of the wire 11 is held by the seat belt buckle 9 (see FIG. 1), and the other end of the wire 11 is held by a piston 15. The piston 15 is slidably housed in the cylinder 14.

The piston 15 has a piston main-body portion 16 that allows the wire 11 to run therethrough, and a wire holding portion 17 that is coupled to the distal end of the piston main-body portion 16 and that fixedly holds the other end of the wire 11. An O-ring 19, that seals a gap between the piston main-body portion 16 and the inner wall surface of the cylinder 14, is arranged in an annular groove 18 that is formed in the piston main-body portion 16.

The piston main-body portion 16 has a tapered portion 20 that is formed closer to the distal end side (the wire holding portion 17 side) than the annular groove 18, the diameter of which becomes progressively larger toward the distal end side. A ball ring 21 and a plurality of balls 22 are arranged between the tapered portion 20 and the inner wall surface of the cylinder 14. This allows the piston 15 to move toward the distal end side (the A direction in the figure) and prevents the piston 15 from moving toward the proximal end side (the B direction in the figure).

On the housing 12 that holds the cylinder 14, a gas generator 23 is provided that generates high-pressure gas for moving the piston 15 in the A direction in the figure. The gas generator 23 has a gas-generating portion and an ignition portion (not shown). For example, if rapid deceleration of the vehicle is detected by a sensor (not shown), an ignition signal is sent to the ignition portion to actuate the ignition portion, and the gas-generating portion ejects high-temperature, high-pressure gas.

A gas flow path 24 and a seal housing portion 25 are formed in the housing 12. The high-pressure gas ejected from the gas generator 23 is supplied to the cylinder 14 through the gas flow path 24. The seal housing portion 25 communicates with the gas flow path 24, and the diameter thereof becomes progressively smaller toward the holder 13 side. The gas flow path 24 is formed between the cylinder 14 and the seal housing portion 25 in the housing 12.

An apertured member 26 is provided in the gas flow path 24 so as to cover at least the gas generator 23 side of a peripheral surface of the wire 11. The apertured member 26 has a plurality of through-holes 29 (see FIG. 3) and, in this example, is composed of a rubber material (synthetic rubber containing various additives, or the like). In this way, by configuring the apertured member 26 to have a plurality of through-holes 29, the high-temperature gas can be diffused efficiently.

FIG. 3 is a perspective view showing the entire structure of the apertured member 26 shown in FIG. 2. As shown in FIG. 3, the apertured member 26 includes a generally cylindrical protecting portion 27, and a seal portion 30 integrally provided at one end (the seal housing portion 25 side end, shown as the right end in FIG. 3) of the protecting portion 27. The protecting portion 27 has a plurality of through-holes 29 provided at the plurality of locations (in this example, four locations) in the circumferential direction of the protecting portion 27. Further, where the through-holes 29 provided at the plurality of locations in the circumferential direction are referred to as one row, a plurality of the rows (in this example, four rows) are provided in the axial direction of the protecting portion 27. The seal portion 30 has a tapered shape that tapers toward the holder 13 side in correspondence with the diameter of the seal housing portion 25.

The other end (the left end in FIG. 3) of the protecting portion 27 is configured to extend to a position somewhat spaced from a proximal end surface 16a (the end surface on the apertured member 26 side) of the piston main-body portion 16 (see FIG. 2) when the piston 15 is in the initial position relative to the cylinder 14 (the state shown in FIG. 2). For example, the other end is spaced from the proximal end surface 16a by a distance corresponding to the diameter of a through-hole 29. Alternatively, the protecting portion 27 may be configured to extend to such a position as to abut the proximal end surface 16a of the piston main-body portion 16.

FIG. 4 is a side sectional view of the apertured member 26. As shown in FIG. 4, the inner diameter D1 of the protecting portion 27 is larger than the outer diameter of the wire 11 by a predetermined value, thereby preventing the protecting portion 27 (that is, the whole of the apertured member 26 that has the protecting portion 27) from being moved by the movement of the wire 11 when the wire 11 is pulled in by the high-pressure gas ejected from the gas generator 23. In addition, the inner diameter D2 of the seal portion 30 is substantially equal to (or slightly smaller than) the outer diameter of the wire 11, and configured such that the wire 11 is slidable relative to the seal portion 30 while maintaining the airtightness.

In the present embodiment that is configured as described above, when a vehicle stops suddenly or a collision or the like occurs and thereby the sensor detects, for example, a rapid deceleration of the vehicle, an ignition signal is sent to the ignition portion of the gas generator 23 and high-temperature, high-pressure gas is ejected from the gas generator 23. Then the high-pressure gas is supplied to the cylinder 14 through the gas flow path 24 in the housing 12 and thereby the piston 15 is displaced in the A direction shown in FIG. 2. As a result, the wire 11 is pulled in as shown in FIG. 5 and simultaneously the seat belt 3 is pulled in through the seat belt buckle 9.

At this time, since the apertured member 26 having a plurality of through-holes 29 is provided on the peripheral surface of the wire 11, when high-pressure gas is ejected from the gas generator 23, the high-pressure gas is diffused by the plurality of through-holes 29 of the apertured member 26. Thus, the high-temperature heat of the high-pressure gas can be diffused and prevented from concentrating locally in one part of the wire 11 as it does in a related structure.

In addition, particularly in the present embodiment, the seal portion 30 seals a gap between the wire 11 and the inner wall surface of the housing 12, and the protecting portion 27 covers the peripheral surface of a portion of the wire 11 closer to the cylinder than the seal portion 30. Thus, a single apertured member 26 serves both to protect the wire 11 from the high-pressure gas ejected from the gas generator 23 and to enhance the pressure efficiency at that time. The apertured member 26 is configured to have the seal portion 30 and the protecting portion 27 formed integrally. Thus, as compared with the case where the protecting portion 27 and the seal portion 30 are separate members, the number of components can be reduced, thereby reducing the material cost and assembly cost.

In addition, particularly in the present embodiment, a plurality of through-holes 29 are provided at a plurality of locations in the circumferential direction of the protecting portion 27, and further, where the through-holes 29 provided at the plurality of locations in the circumferential direction are referred to as one row, a plurality of the rows are provided in the axial direction of the protecting portion 27. Thus, when high-pressure gas is ejected by the gas generator 23, the high-pressure gas is diffused efficiently by the plurality of through-holes 29 provided at the plurality of locations in the circumferential direction and in the plurality of rows in the axial direction of the protecting portion 27. As a result, the high-temperature heat of the high-pressure gas can be dispersed efficiently, and the high-temperature heat can be efficiently prevented from concentrating locally in one part of the wire 11.

In addition, particularly in the present embodiment, the protecting portion 27 is formed such that the inner diameter D1 thereof is larger than the outer diameter of the wire 11 by a predetermined value. Thus, a gap can be provided between the protecting portion 27 and the wire 11 so that, when the wire 11 is pulled in by the high-pressure gas ejected from the gas generator 23, the protecting portion 27 (that is, the whole of the apertured member 26 that has the protecting portion 27) can be prevented from being moved by the movement of the wire 11.

While in the above-described embodiment the inner diameter of the protecting portion 27 is larger than the outer diameter of the wire 11 (hereinafter referred to as "method 1") in order to prevent the movement of the apertured member 26 when the wire 11 is pulled in, various other methods are conceivable.

For example, as shown in FIG. 6, a locking portion 28 for restricting the movement of the seal portion 30 may be provided in the housing 12 (hereinafter referred to as "method 2"). The locking portion 28 locks the seal portion 30 to the housing 12 when the wire 11 is pulled in, so that the seal portion 30 (that is, the whole of the apertured member 26 that has the seal portion 30) can be prevented from being moved by the movement of the wire 11 when the wire 11 is pulled in by the high-pressure gas ejected from the gas generator 23. In this modification, the inner diameter of the protecting portion 27 does not need to be larger than the outer diameter of the wire 11.

Alternatively, for example as shown in FIG. 7, a weak portion 31 (a thin-walled portion in this example; alternatively, it may be a slit, perforations or the like) may be provided in the apertured member 26 between the seal portion 30 and the protecting portion 27 (hereinafter referred to as "method 3"). Thus, when the wire 11 is pulled in by the high-pressure gas ejected from the gas generator 23, even if the protecting portion 27 is moved by the movement of the wire, the weak portion 31 allows the protecting portion 27 to separate from the seal portion 30 so that the seal portion 30 can be prevented from moving.

The above-described methods 1, 2 and 3 may be appropriately combined.

While the seal portion 30 has been described hereinabove as having a tapered shape, the shape of the seal portion 30 is not particularly limited thereto, and may be a cylindrical shape the outer diameter of which is entirely uniform in the axial direction.

While a pretensioner of the present invention has been described hereinabove in an example in which the pretensioner is applied to a seat belt apparatus having a seat belt that includes a shoulder belt and a lap belt, this is not limitative. The pretensioner may be applied to a seat belt apparatus having a seat belt that includes a lap belt alone. Even in that case, the same effects as those of the above-described embodiment can be obtained.

While the present invention has been described hereinabove in an example in which the invention is applied to a pretensioner that pulls in a seat belt buckle, the invention is not limited thereto and is applicable to a pretensioner that is located on the side of the seat opposite from the seat belt buckle (the anchor-plate side), and that pulls in the lap belt. Even in that case, the same effects as those of the above-described embodiment can be obtained.

Figure 1:
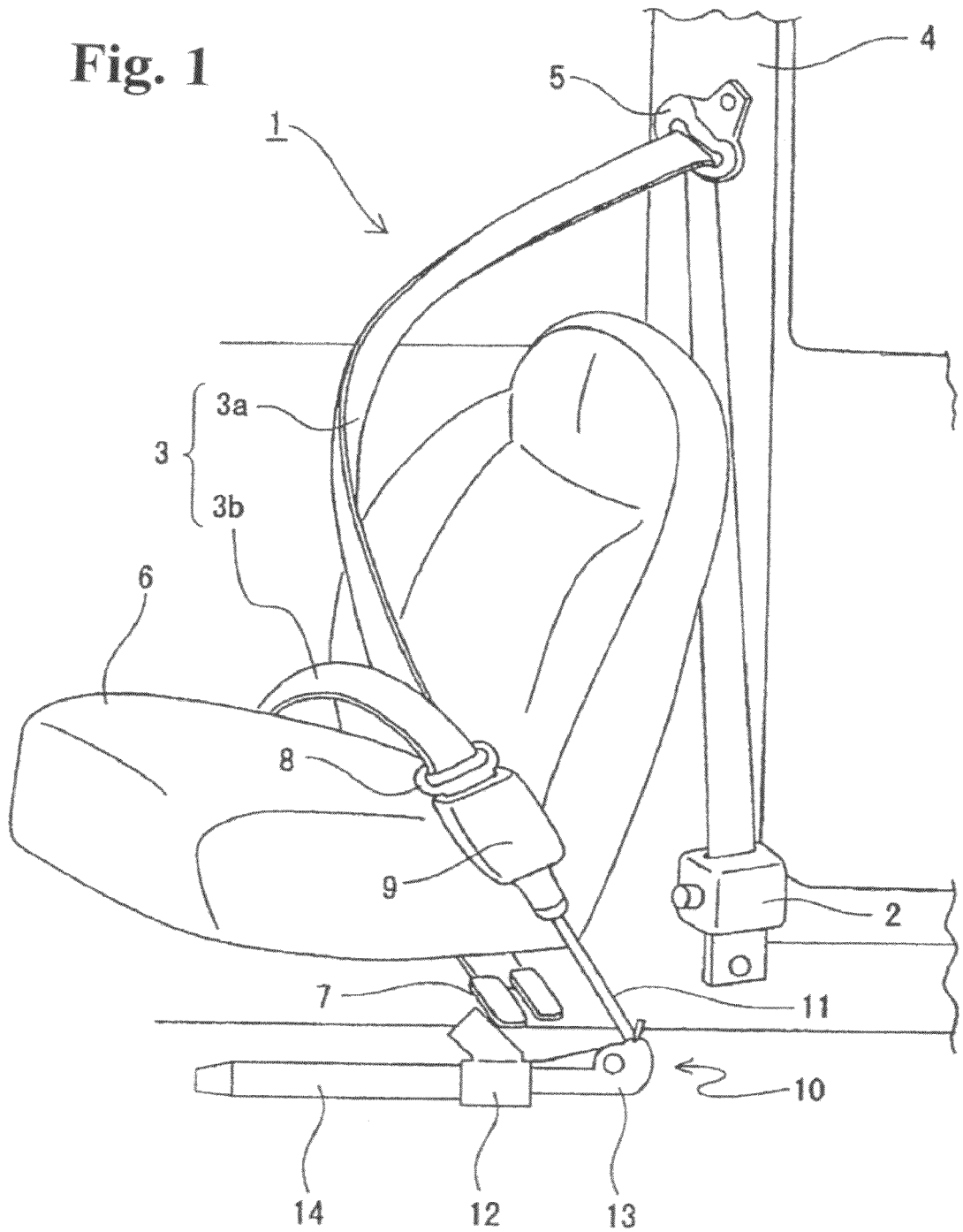
FIG. 1 is a perspective view illustrating a seat belt apparatus having an embodiment of a pretensioner according to the present invention.
Figure 2:
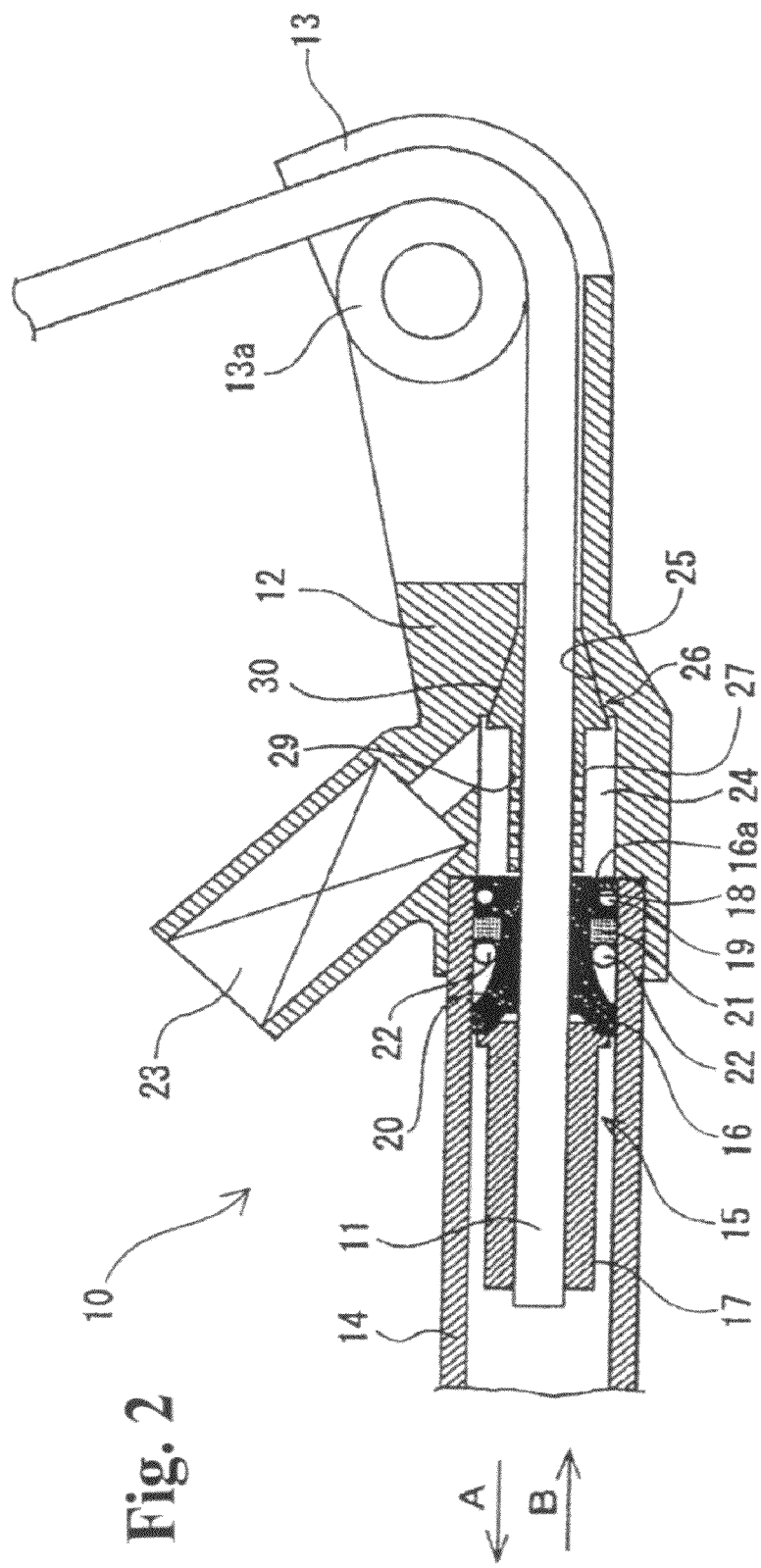
FIG. 2 is a vertical sectional view of the pretensioner shown in FIG. 1.
Figure 3:
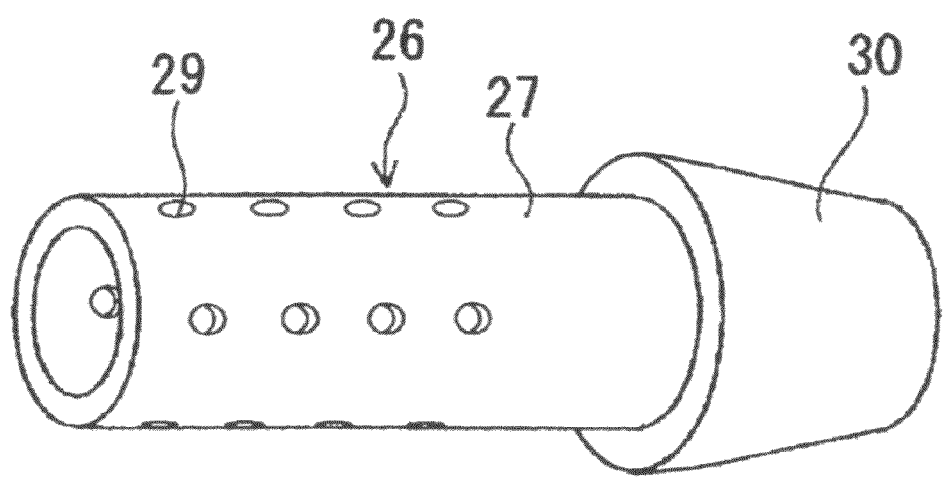
FIG. 3 is a perspective view illustrating the entire structure of an apertured member shown in FIG. 2.
Figure 4:
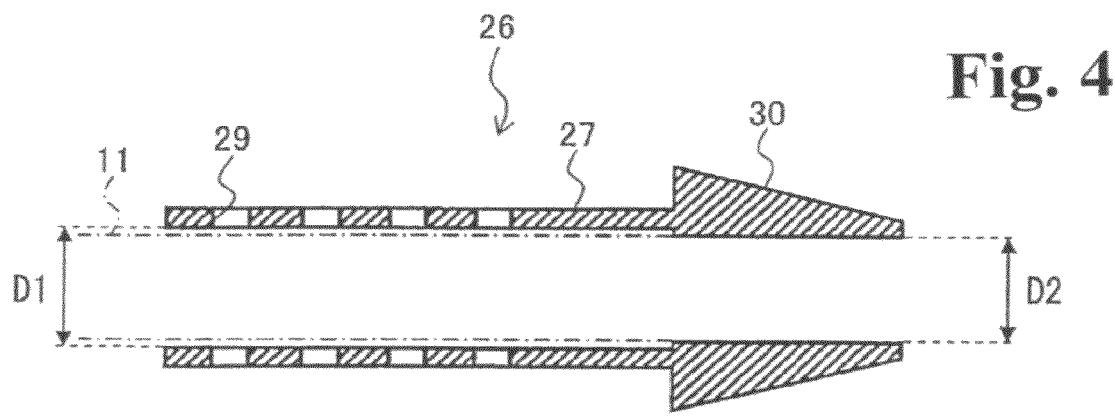
FIG. 4 is a side sectional view of the apertured member shown in FIG. 3.
Figure 5:
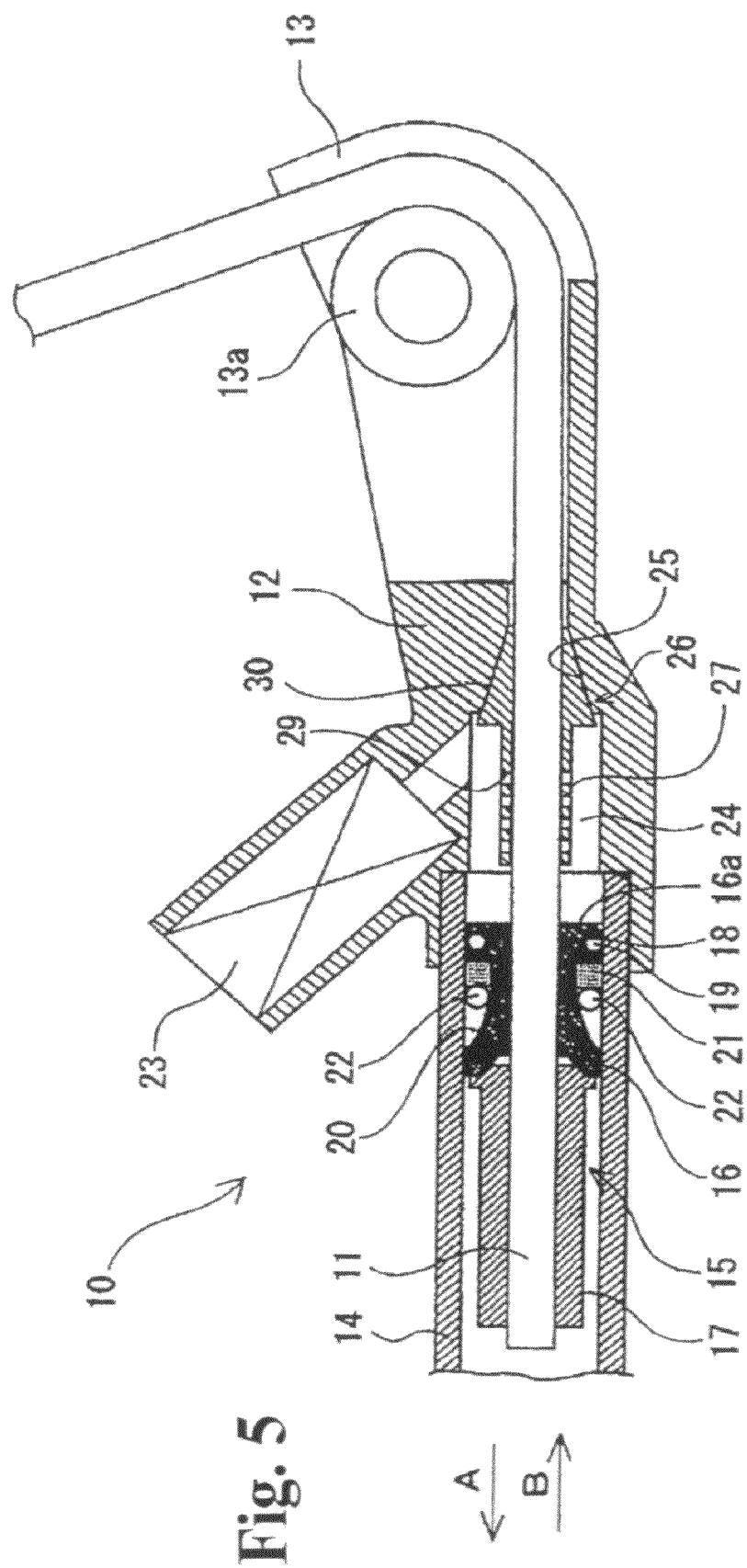
FIG. 5 is a vertical sectional view illustrating a state in which the pretensioner shown in FIG. 2 is actuated.
Figure 6:
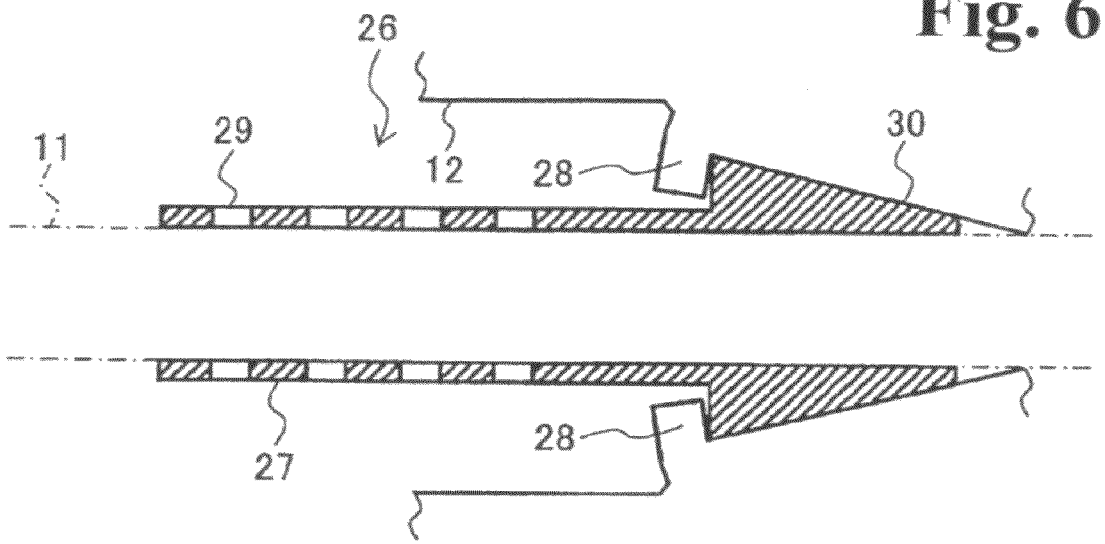
FIG. 6 is a vertical sectional view illustrating a modification in which a locking portion is provided in a housing.
Figure 7:
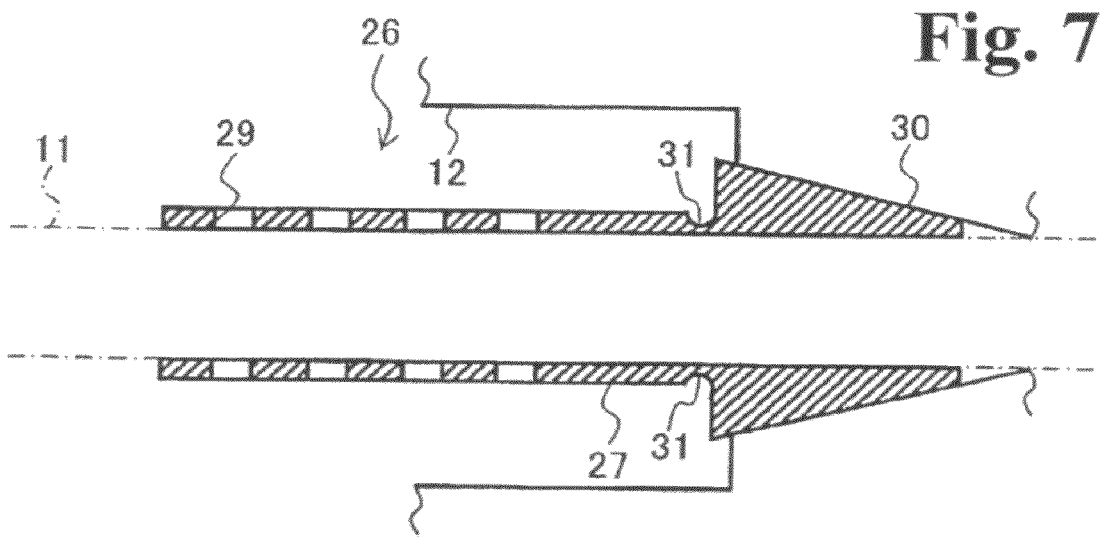
FIG. 7 is a vertical sectional view illustrating a modification in which a weak portion is provided in an apertured member.

REFERENCE NUMERALS 1 seat belt apparatus
2 retractor
3 seat belt
3a shoulder belt portion (shoulder belt)
3b lap belt portion (lap belt)
8 tongue
9 seat belt buckle
10 pretensioner
11 wire
12 housing
14 cylinder
15 piston
16a proximal end surface
23 gas generator (gas-supplying means)
24 gas flow path (gas-supplying means)
26 apertured member
27 protecting portion
28 locking portion
29 through-hole
30 seal portion
31 weak portion

The invention claimed is:

1. A pretensioner that exerts a pull-in force on a seat belt including at least a lap belt among a shoulder belt and the lap belt when a vehicle undergoes an impact, the pretensioner comprising:
a wire that is connected at one end to the seat belt;
a piston that is connected to the other end of the wire;
a cylinder that houses the piston slidably;
a housing that allows the wire to run therethrough and holds the cylinder;
a gas-supplying device that supplies gas into the cylinder through an interior of the housing in order to operate the piston in a direction in which the wire is pulled in; and
an apertured member that is arranged in the housing so as to cover at least a gas-supplying device side of a peripheral surface of the wire, and that has a plurality of through-holes and thereby is able to diffuse the gas,
wherein the apertured member has a seal portion that seals a gap between the wire and an inner wall surface of the housing, and a protecting portion that extends from the seal portion to a cylinder side and covers the peripheral surface of the wire, the seal portion and the protecting portions being formed integrally; and
the plurality of through-holes is provided in the protecting portion.

2. The pretensioner according to claim 1, wherein the through-holes are provided at a plurality of locations in a circumferential direction of the protecting portion and further, where the through-holes provided at a plurality of locations in the circumferential direction are referred to as one row, the through-holes are provided in a plurality of the rows in an axial direction of the protecting portion.

3. The pretensioner according to claim 2, wherein the protecting portion is formed such that an inner diameter thereof is larger than an outer diameter of the wire by a predetermined value.

4. The pretensioner according to claim 2, wherein the housing has a locking portion for restricting movement of the seal portion when the wire is pulled in.

5. The pretensioner according to claim 2, wherein the apertured member has a weak portion that allows the protecting portion to separate from the seal portion when the wire is pulled in.

6. A seat belt apparatus, comprising:
a seat belt that includes at least a lap belt among a shoulder belt and the lap belt;
a retractor that retracts the seat belt;
a tongue provided on the seat belt; and
a pretensioner that exerts a pull-in force on the seat belt when a vehicle undergoes an impact, wherein the pretensioner comprises:
a wire that is connected at one end to the seat belt;
a piston that is connected to the other end of the wire;
a cylinder that houses the piston slidably;
a housing that allows the wire to run therethrough and holds the cylinder;
a gas-supplying device that supplies gas into the cylinder through an interior of the housing in order to operate the piston in a direction in which the wire is pulled in; and an apertured member that is arranged in the housing so as to cover at least a gas-supplying device side of a peripheral surface of the wire, and that has a plurality of through-holes and thereby is able to diffuse the gas,
wherein the apertured member has a seal portion that seals a gap between the wire and an inner wall surface of the housing, and a protecting portion that extends from the seal portion to a cylinder side and covers the peripheral surface of the wire, the seal portion and the protecting portions being formed integrally; and
the plurality of through-holes is provided in the protecting portion.

* * * * *